United States Patent
Hirschberg et al.

(10) Patent No.: US 7,664,636 B1
(45) Date of Patent: Feb. 16, 2010

(54) SYSTEM AND METHOD FOR INDEXING VOICE MAIL MESSAGES BY SPEAKER

(75) Inventors: Julia Hirschberg, Cranford, NJ (US); Sarangarajan Parthasarathy, New Providence, NJ (US); Aaron Edward Rosenberg, Berkeley Heights, NJ (US); Stephen Whittaker, Morristown, NJ (US)

(73) Assignee: AT&T Intellectual Property II, L.P., New York, NY (US)

( * ) Notice: Subject to any disclaimer, the term of this patent is extended or adjusted under 35 U.S.C. 154(b) by 0 days.

(21) Appl. No.: 09/550,686

(22) Filed: Apr. 17, 2000

(51) Int. Cl.
 *G10L 15/00* (2006.01)

(52) U.S. Cl. .................. 704/231; 704/251; 704/257; 704/271; 704/275; 379/1.02; 455/412.1; 455/412.2; 455/413

(58) Field of Classification Search .............. 704/1, 704/240, 246, 251, 9, 275, 270, 231, 257, 704/271; 379/88.01, 88.12, 88.13, 88.22, 379/89, 67, 88.23, 1.02, 88.02; 455/412.1, 455/412.2, 413
See application file for complete search history.

(56) References Cited

U.S. PATENT DOCUMENTS

| | | | | |
|---|---|---|---|---|
| 5,797,124 A * | 8/1998 | Walsh et al. | ................. | 704/275 |
| 5,960,392 A * | 9/1999 | Sundberg et al. | ............. | 704/236 |
| 6,219,407 B1 * | 4/2001 | Kanevsky et al. | ........ | 379/88.02 |
| 6,327,343 B1 * | 12/2001 | Epstein et al. | ............ | 379/88.02 |
| 6,424,946 B1 * | 7/2002 | Tritschler et al. | ............ | 704/272 |
| 6,445,775 B1 * | 9/2002 | Morganstein et al. | .... | 379/88.02 |
| 6,766,295 B1 * | 7/2004 | Murveit et al. | .............. | 704/243 |
| 6,775,651 B1 * | 8/2004 | Lewis et al. | ................. | 704/235 |

* cited by examiner

*Primary Examiner*—David R Hudspeth
*Assistant Examiner*—Lamont M Spooner

(57) ABSTRACT

The invention provides a system and method for indexing and organizing voice mail message by the speaker of the message. One or more speaker models are created from voice mail messages received. As additional messages are left, each of the new messages are compared with existing speaker models to determine the identity of the callers of each of the new messages. The voice mail messages are organized within a user's mailbox by caller. Unknown callers may be identified and tagged by the user and then used to create new speaker models and/or update existing speaker models.

12 Claims, 4 Drawing Sheets

SYSTEM AND METHOD FOR INDEXING VOICE MAIL MESSAGES BY SPEAKER

BACKGROUND OF THE INVENTION

The present invention relates to communication systems and, more particularly, to a message system and method for tagging and organizing voice mail messages.

Modern communications systems, such as a telecommunication system, frequently include voice mail, which permits a calling party to leave a message for subsequent retrieval by a called party (e.g., the party to whom the message is addressed). The voice mail feature is often used when the called party does not answer an incoming call initiated by the calling party and the call is automatically redirected to the called party's voice mailbox. At this time, the calling party may leave a voice mail message for the called party, which message may be subsequently retrieved by the called party (i.e., the intended recipient) by issuance of a command or series of commands to the communications system that has stored the message for such later retrieval.

The voice mail feature is also used where both the calling and called parties have mailboxes. In this manner, the calling party may create a message in the calling party's mailbox, address the message to the called party's mailbox, and transmit the message from the calling party's mailbox to the called party's mailbox for subsequent retrieval by the called party.

Centralized voice mail system processes generally involve the storage of recorded voice messages on storage equipment associated with the communication system's switching network. The called party or subscriber retrieves the message(s) at a subsequent time when the called party issues a command or series of commands through the called party's telephone station set to the storage equipment of the communications network.

Voice mail systems allow multiple callers to leave messages in a called party's mailbox when the called party cannot answer a telephone call. Called parties are frequently unable to retrieve and delete messages from the mailbox as quickly as they are deposited, thus requiring voice mailboxes to have the ability to retain multiple messages.

In a typical communication network, a called party accesses a mailbox by dialing into the voice mail system, either directly, in the case of an in-house system, or through the telephone network, in the case of centralized network systems. The user then supplies a mailbox number and password. A major drawback of these voice mail systems is that the messages must be listened to serially, i.e. only one message can be played to that one user at a time. Overlapping or concurrent retrieval is not possible which clearly has a negative impact on productivity.

Although some systems allow high priority messages to be presented to the called party first, this merely changes the order of the sequence, not its length. The length of time to retrieve and delete messages keeps a user busy for a long period of time. The situation is exacerbated by improvements in storage technology which will make it possible to create mailboxes with many hours of message storage. Furthermore, many times it is difficult to determine the identity of callers leaving voice mail message without having to listen to at least a portion or majority of the voice mail message. Thus, a voice mail subscriber cannot prioritize listening of their voice mail messages since the subscriber cannot readily determine the identity of the callers who have left voice mail messages.

Accordingly, it would be desirable to have a system and user interface by which voice mail messages can be tagged, indexed and catalogued by caller thereby aiding in organization, retrieval, searching and storage of these messages.

SUMMARY OF THE INVENTION

The present invention provides a system and method for organizing a user's voice mail messages by the caller's identity. The present method involves receiving one or more voice mail messages from one or more callers, processing and comparing speech signals from each of the voice mail messages with one or more caller speaker models, determining the identity of the caller of each of the voice mail messages and tagging each of the voice mail messages with the determined identity of the respective caller for each voice mail message. The voice mail messages are stored in folders or sub-mailboxes which correspond to specific callers. Preferably, speaker recognition techniques are used to analyze the speech signals from the voice mail messages to both create speaker models and identify callers by comparing the speech signals from a voice mail message with the speaker models.

The present system includes a voice mail server which creates speaker models and compares incoming voice mail messages with existing speaker models to determine the identity of each respective caller. A voice mail message may be tagged with the respective caller identity and saved in a storage facility which is organized by caller identity. Voice mail messages which do not match any existing speaker models and/or do not exceed a certain matching quality threshold, are labeled as unknown. The user may provide to the voice mail server, caller or speaker tags for voice mail messages which do not match existing speaker models. Voice mail messages which do not match existing speaker models may also be used to modify existing speaker models by the voice mail server.

The present system and method may also use automatic number identification to aid in determining the caller identity. Speech recognition, natural language techniques and content mining may also be used in determining the caller's identity.

DETAILED DESCRIPTION OF THE INVENTION

Figure 1:
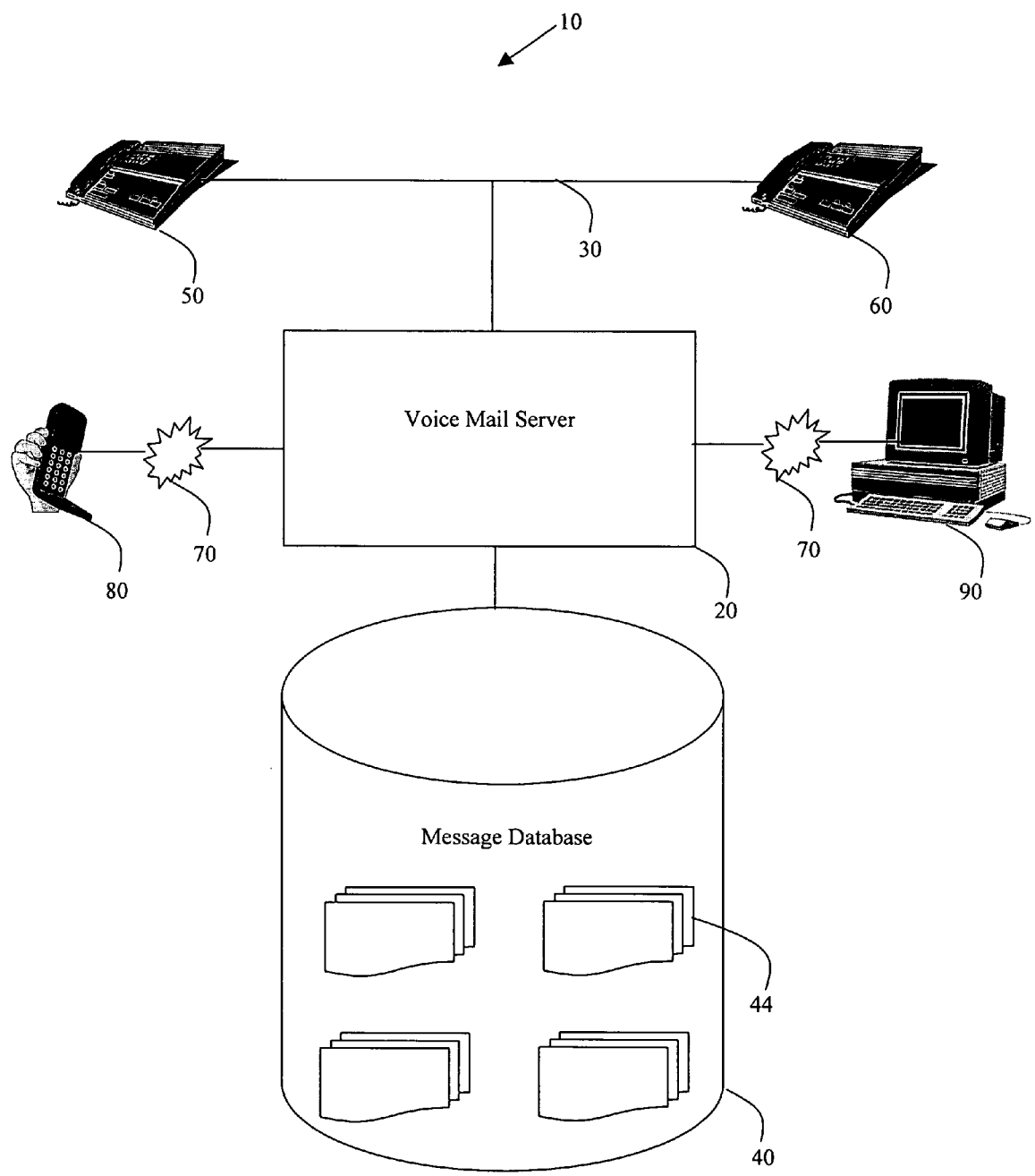
FIG. 1 illustrates an exemplary system in accordance with the teachings of the present invention.

Referring to FIG. 1, a voice message network system 10 is illustrated in FIG. 1 having at least one voice mail server 20. While the preferred embodiment of the present invention is described and illustrated below as a voice message network having one voice mail server, the present invention may easily be implemented with two or more voice mail servers which may be in communication with one another. In this manner, voice mail server 20 may be connected via an inter-mailbox data network to other respective voice mail servers, not shown, in the voice mailbox network system 10. Thus, each voice mail server would be able to communicate (e.g., transmit and receive information) with the other voice mail servers in the voice mailbox network system.

Referring now to FIG. 1, the voice message network system 10 is illustrated as having a voice mail server 20 connected as part of a primary communications network 30, such as an intra company voice mail system. It is understood that primary communications network 30 could be a private branch exchange (PBX), Centrex, or similar communication or telecommunication system that controls access to the voice mail server 20. The primary communications network 30 connects subscribers, such as subscribers 50 and 60, in the network to the voice mail server 20.

Voice mail server 20 is preferably in communication with a storage facility 40, or voice mail message database, for storing system subscriber information and voice mail message files, speaker models for analyzing incoming voice mail messages as discussed in more detail later herein, as well as the operating programs for the particular voice mail server served by the storage facility 40. The storage facility 40 may be any type or combination of types of storage media such as magnetic, optical, optical-magnetic, etc. so long as the storage facility has sufficient capacity to store a plurality of voice mail messages from a plurality of subscribers. As discussed in more detail later herein, the storage facility 50 is divided or partitioned into different "folders" or sub-mailboxes 44 which contain each subscriber's voice mail messages organized by each respective caller.

Voice mail server 20 is preferably a computer system that essentially functions as a central answering machine for subscribers to the voice mail system. It is understood that the present invention can be utilized in or adapted to a variety of voice mail servers or similar equipment. One well known voice mail server or system, which may be modified to perform the operations of the present invention, is an audio exchange system known as AUDIX.

Voice mail server 20 is also connected via respective trunk lines to a communications network 70, which is illustrated in FIG. 1 as preferably being the public switched telephone network. In this manner, a caller may access the voice mail server 20 via communications network 70 through use of a telephone station set 80 and/or personal computer 90 or other similar device. It is also understood that access to the voice mail server is not intended to be limited to telephones and/or personal computers, but could be, for instance, wireless devices, conventional facsimile machines, palmtops, or any other device that is capable of transmitting and receiving data over a telephone line.

In the present system, each subscriber who has subscribed to the answering services offered by a service provider is assigned a "mailbox" on the storage facility of the voice mail server ("called party's voice mail server") into which messages may be entered by a caller ("calling party") and subsequently retrieved by the called party. In addition to retrieving messages, a subscriber may access the subscriber's mailbox and create and transmit messages to another subscriber's mailbox over an inter-mailbox data network or primary communications network as described earlier herein.

Figure 2:
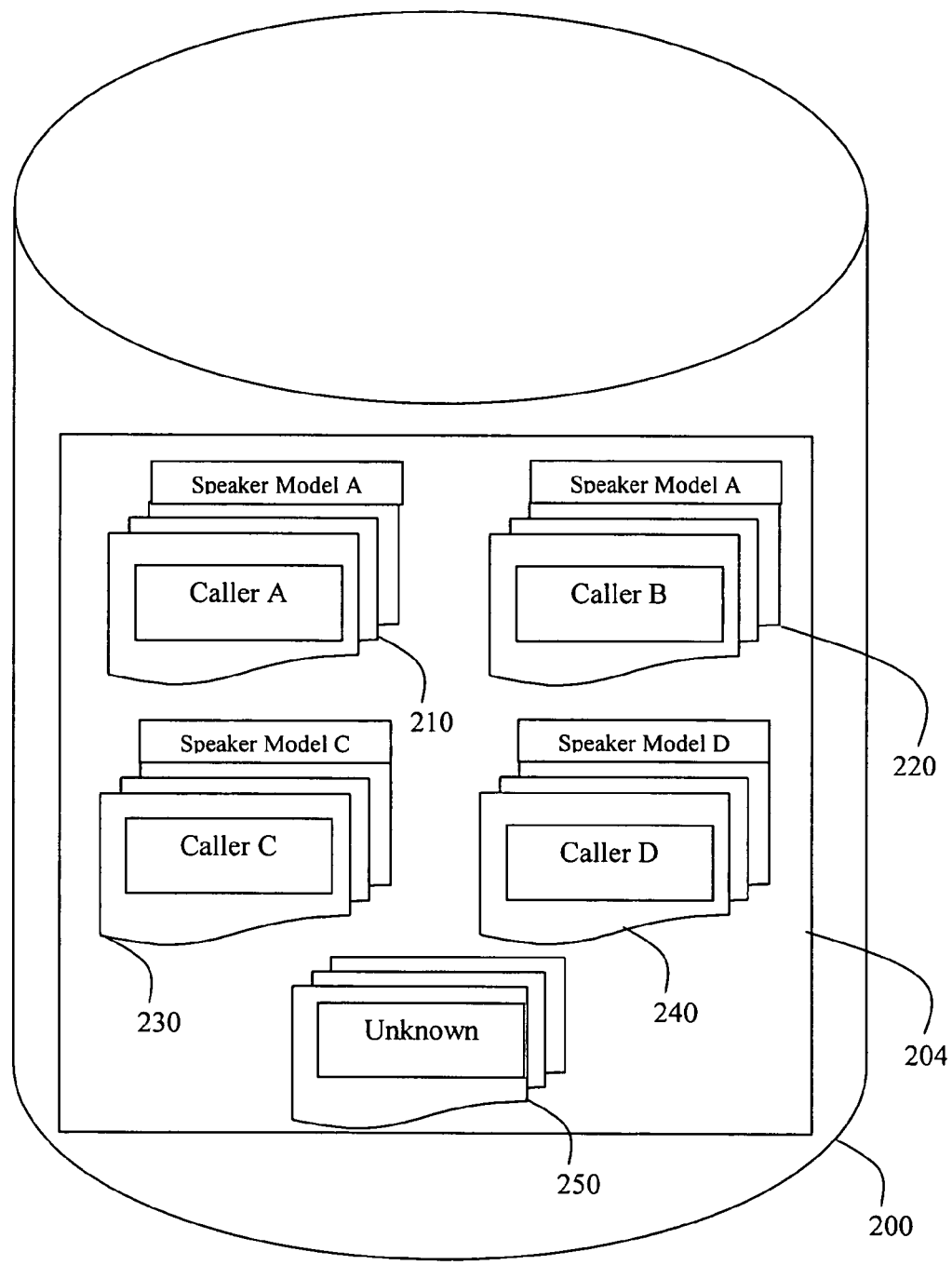
FIG. 2 illustrates an exemplary storage facility in accordance with the teachings of the present invention.

In an embodiment of the present invention as shown in FIG. 2, the subscriber's or user's mailbox on the storage facility 200 is organized into caller specific sub-mailboxes or folders. As used herein, the term "folder" is used to indicate the relative organizational structure of voice mail messages for a subscriber of the system. The "folder" may be an actual separate directory or partitioning on the storage facility or it may be a virtual folder, wherein each of a subscriber voice mail messages are indexed so that voice mail messages for a specific caller can be accessed as though they are stored in a single location. In the present invention, each sub-mailbox or folder on the storage facility 200 represents a unique caller. For example, the user may have a primary mailbox 204 which contains five folders, namely, Caller A folder 210, Caller B folder 220, Caller C folder 230, Caller D folder 240 and Unknown caller folder 250. Thus, as discussed in more detail later herein, as new voice mail messages are left for the user, each message is tagged with a matching caller identifier, i.e. the name of the caller, and stored in the appropriate folder which corresponds to the caller identity, i.e. Caller A, Caller B, etc. If no match is made for the voice mail message, the message will be stored in the Unknown caller folder.

Figure 3:
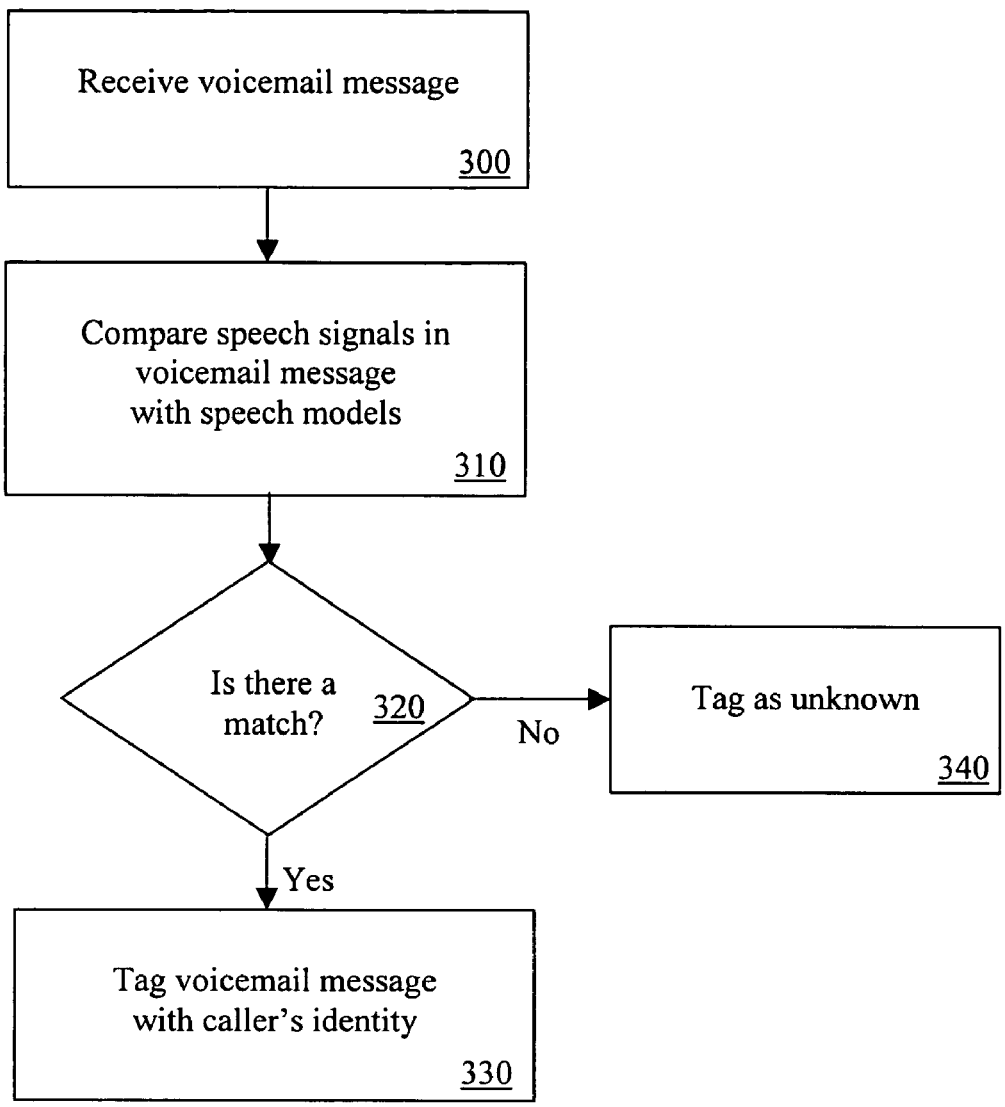
FIG. 3 illustrates an exemplary process in accordance with the teachings of the present invention.

Referring to FIG. 3, an exemplary process of the present invention is shown. The system first receives a voice mail message, step 300. Typically the voice mail message is stored in a storage facility as discussed earlier herein. Once stored, speech signals in the voice mail message are analyzed and compared with speaker models for specific callers the voice mail subscriber has stored, step 310. The system determines if there is a match between the speech signals in the voice mail message and an existing speaker model, step 320. If a match exists, the voice mail message is tagged with the caller's identity, step 330. If no match exists, the voice mail message is tagged as unknown, step 340.

In determining whether a match for the voice mail message exists, a specific matching score threshold limit may be set. If the matching score, which measures the extent to which the voice mail speech signal matches a specific speaker model, exceeds the matching score threshold, a match is said to exist. The quality of the match, as measured by the matching score, may be affected by a number of factors, including environmental noise and distortion affecting the recording, and transmission channel noise and distortion, notably originating in wireless telephone channels. The quality of the match may also be affected by other conditions, including the caller's speaking behavior, the duration of the message, and the similarity of the caller's speaker model to other callers' models. With respect to any of these factors, when the matching score does not exceed the matching score threshold, the voice message may be tagged as "unknown" thereby requiring the user or subscriber to label the voice with a speaker tag if he/she wishes to store the message in a specific caller folder.

In the present invention, the callers of voice mail messages are identified by analyzing speech signals from the voice mail message and comparing the speech signals to speaker models which have been created. Each speaker model represents a unique caller and is identified by unique acoustic features which have been extracted from that caller's voice mail message(s). As shown in FIG. 2, for example, Caller A will have a Speaker model A associated with it, Caller B will have a Speaker model B associated with it, Caller C will have a Speaker model C associated with it, and Caller D will have a Speaker model D associated with it. In the present invention, the speech signals from the voice mail messages are analyzed and speaker models are created using speaker recognition techniques. For example, some exemplary speaker recognition techniques are disclosed in Speaker Identification and Verification Using Gaussian Mixture Speaker Models, Speech Communication 17, pp.91-108, Douglas A. Reynolds, the teachings of which are incorporated herein by reference. Here, the speaker verification involves a likelihood ratio of quantifying the likelihood of the utterance if from a given speaker. This provides a gauge of certainty to the system regarding the verification.

In one embodiment, when implementing a first or new installation of the system of the present invention, no speaker models will exist. As new users or subscribers are added to the system, speaker models will be created by each user or subscriber in the system. As speaker models are created, subsequent users or subscribers of the system may elect to use previously created speaker models and/or simply start with no speaker models. It is contemplated that users or subscribers may share and exchange speaker models within the system. In a variation of this embodiment, a first or new installation of the system may be provided with an existing pool of speaker models which are created from one or more voice mail messages where the identity of the caller is known. This existing pool of speaker models may be selectively used by one or more users or subscribers as they are added to the system.

In the present invention, when a user or subscriber receives a voice mail message, the user or subscriber may then manually identify or tag these voice mail messages with specific speaker or caller labels. For example, if a user receives three voice mail messages, i.e. message 1, message 2 and message 3, the user may tag each of the messages with the appropriate speaker label, i.e. message 1 may be associated with a Caller X, message 2 may be associated with a Caller Y and message 3 may be associated with a Caller Z. The user will tag these messages with the appropriate speaker labels such that new speaker models are created for Caller X, Caller Y and Caller Z. Thus whenever the user receives new additional voice mail messages, the system will compare the speech signals from these new voice mail messages with the three new speaker models, namely speaker models for Caller X, Caller Y and Caller Z. If the new voice mail message does match any of the speaker models, say, for example, the Caller Y speaker model, the speech signal data from the new voice mail message may be used to modify and/or improve the existing speaker model for Caller Y. If the new voice mail message does not match any of the speaker models or closely matches more than one speaker model, then the new voice mail message may be tagged as "unknown" and be placed into the UNKNOWN folder as discussed earlier herein. The user or subscriber is given the opportunity to provide a speaker label for messages tagged as "unknown." Once a speaker label for the previously "unknown" message has been provided, the speech signals in the message may be used to create a new speaker model if one for that speaker does not already exist, or alternatively, the speech signals in the message may be used to modify an existing speaker model.

Figure 4:
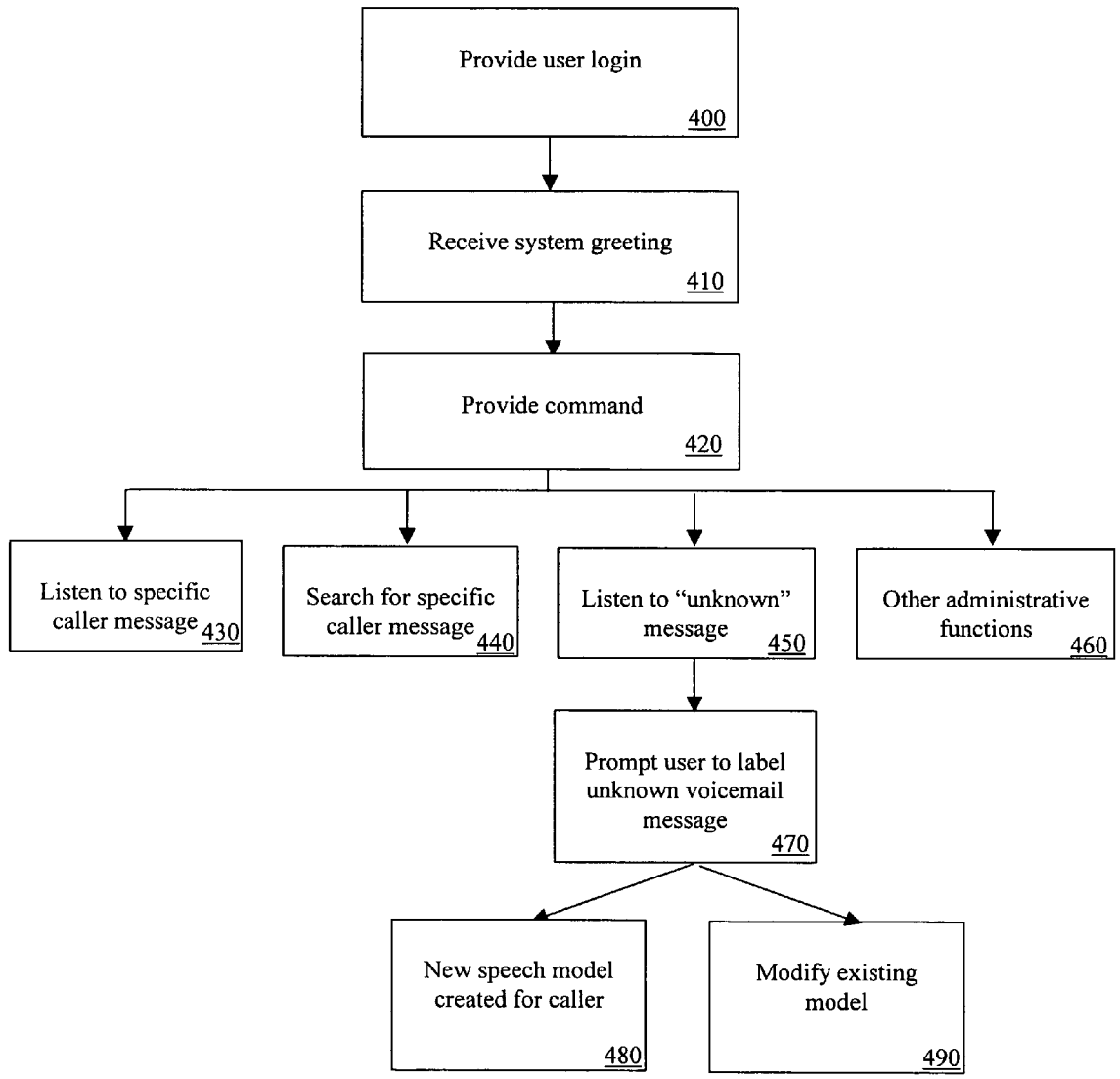
FIG. 4 illustrates an exemplary user session for the system of the present invention.

Referring to FIG. 4, an exemplary user or subscriber interaction with the system of the present invention is shown. When accessing the system, the user will typically provide a login and/or password to access his/her respective mailbox, step 400. The user or subscriber will receive a system greeting such as "You have three new voice mail messages: one from Caller X, One from Caller Y and one Unknown" step 410. In response thereto, the user may issue a command, such as through the system Interactive Voice Response Unit, step 420. The user may listen to all messages serially, listen to a specific caller message, step 430, search for a specific caller message, step 440, listen to messages tagged as "unknown", step 450 and/or perform other administrative functions, step 460 such as change his/her outgoing messages or perform mailbox maintenance such as deleting old messages, etc. If the user elects to listen to "unknown" messages, step 450, the system may prompt the user to label or tag the unknown message with a caller or speaker tag, step 470. With the speaker label provided by the user, the system will either create a new speaker model with the speech signals from the message, step 480 or the system will use the speech signals to modify or correct an existing speaker model, step 490.

In the present invention, it is conceivable that a message may be received from a caller for which a speaker model exists, but the system does not provide a correct match with the caller and the speaker model for any number of reasons. For example, at times a call may be made from a "noisy" line, i.e. where static and line interference may interfere with the integrity of the call signal and consequently with the speech signals extracted from that voice mail message. In such a case, the user may correct the caller label provided by the voice mail server or simply discard or ignore the message.

In the present invention, the user may interact with the system via a number of user interfaces. Generally, the user will be interacting with the voice mail system through an Interactive Voice Response Unit which may be responsive to the user's input through speech signal provided over a telephone speaker and/or tone signals provided over a telephone keypad, such as through a standard landline phone, ISDN unit or wireless telephone device. Thus the user may access the voice mail system, provide speaker or caller labels, save and delete voice mail messages, search voice mail messages and access other administrative function through this interface. Additionally, the user may access the system of the present invention through a personal computer, palmtop device, laptop and other communicative device capable of interfacing with the voice mail system. In an embodiment where a personal computer is used for access, the user may be provided with a graphical user interface which represents the user's mailbox with one or more visual identifiers, i.e. icons provided on a visual display. The user's mailbox may be further divided into caller mailboxes and/or folders which are represented on the screen by separate icons.

In another embodiment of the present invention, other techniques may be used to aid the system in determining the identity of a caller. For example, in one embodiment, automatic number identification (ANI) information may be used to supplement the speech signal analysis as discussed above. ANI information is generated and conveyed into the PSTN whenever a call is originated from such a device such as a standard landline phone and/or a wireless phone. The ANI information is typically the sender's home, business or wireless telephone number, which therefore provides useful information indicative of the sender's particular location and identity. In the present invention, along with making a preliminary determination of a caller's identity based on speech signals from the voice mail message, such ANI information may also be provide and processed by the voice mail server to supplement the speech signal analysis. For example, if a voice mail message is received which matches two or more known speaker models in the system, the ANI information may be used to narrow down the possible caller identity choices since if it is known that a specific caller has a certain originating number, this information may be used to determine the caller's identity.

Additionally, the actual content of the voice mail message may also be used by the present system to aid in the determination of the caller's identity. For example, a caller may provide some identifying content within the voice mail message, such as their first name and/or last name. Through standard speech recognition techniques and/or natural language techniques, the system may be able to recognize the caller's identity and use this information to determine the caller's identity.

It will be apparent to those skilled in the art that many changes and substitutions can be made to the system and method described herein without departing from the spirit and scope of the invention as defined by the appended claims.

We claim:

1. A method for indexing voice mail messages, comprising:
receiving and storing one or more voice mail messages from one or more callers;
determining an identity of each of the one or more callers in each of the one or more voice mail messages (1) by comparing speech signals from each of the one or more voice mail messages with one or more caller speaker models and (2) based on an analysis of the content of each of the one or more voice mail messages;

tagging each of the one or more voice mail messages with the respective determined identity; and when the determined identity of the caller of a voice mail message cannot be determined to a threshold certainty:

tagging the voice mail message from the caller as unknown;

receiving an indicated identity of the caller from a voice mail subscriber;

if the received indicated identity does not match any known identities, creating a new storage folder for voice mail messages from the caller corresponding to the received indicated identity; and if the received indicated identity matches a known identity, modifying a speaker model associated with the known identity based on speech signals in the voicemail message associated with the received indicated identity.

2. The method of claim 1, wherein the one or more caller speaker models are created from one or more voice mail messages left by a same caller.

3. The method of claim 1, wherein the one or more speaker models are created using acoustic features extracted from the voice mail message, the acoustic features extracted using speaker recognition techniques.

4. The method of claim 1, wherein the step of determining the identity of each of the one or more callers in each of the one or more voice mail messages includes the substep of:

using automatic number identification to assist in determining the caller's identity.

5. The method of claim 1, wherein the step of determining the identity of each of the one or more callers includes the substep of:

using speech recognition techniques to extract caller identity information from the one or more voice mail messages.

6. A method for indexing voice mail messages, comprising:

receiving and storing one or more voice mail messages from one or more callers;

determining an identity of each of the one or more callers in each of the one or more voice mail messages (1) by comparing speech signals from each of the one or more voice mail messages with one or more caller speaker models and (2) based on an analysis of the content of each of the one or more voice mail messages;

tagging each of the one or more voice mail messages with the respective determined identity; and when the determined identity of the caller of a voice mail message cannot be determined to a threshold certainty:

tagging that voice mail message as unknown; and receiving an indicated identity of the caller from a voice mail subscriber, wherein if the voice mail message is tagged as unknown, receiving further comprises creating a new storage folder for voice mail messages from the caller corresponding to the received caller identity, and if the received indicated identity matches a previously created speaker model, receiving further comprises adapting the previously created speaker model based on speech signals in the voice mail message associated with the speaker.

7. A system for processing voice mail messages, the system comprising:

means for receiving and storing one or more voice mail messages;

means for determining an identity of a speaker of each of the one or more voice mail messages (1) by comparing speech signals from each of the voice mail messages with a group of speaker models and (2) based on an analysis of the content of each of the one or more voice mail messages;

means for tagging each of the one or more voice mail messages with the respective determined identity;

means for, when the determined identity of the speaker of a voice mail message cannot be determined to a threshold certainty, tagging the voice mail message as unknown, receiving an indicated identity of the speaker from a voice mail subscriber and creating a new storage folder for voice mail messages from the speaker corresponding to the received indicated identity; and means for adapting a previously created speaker model associated with the speaker based on speech signals in the voice mail message associated with the speaker.

8. The system of claim 7, wherein the speaker models are created from one or more voice mail messages left by a same caller.

9. The system of claim 7, wherein the speaker models are created using acoustic features extracted from the one or more voice mail messages, the acoustic features extracted using speaker recognition techniques.

10. The system of claim 7, wherein the voice mail message tagged as unknown is used to adapt the previously created speaker model.

11. The system of claim 7, wherein the means for determining an identity of a speaker of each of the one or more voice mail messages further comprises means for using automatic number identification to assist in determining the identity of the speaker.

12. The system of claim 7, wherein the means for determining an identity of a speaker of each of the one or more voice mail messages further comprises means for using speech recognition techniques to extract caller identity information from each one of the one or more voice mail messages.

* * * * *